United States Patent [19]

Gallucci et al.

[11] Patent Number: 5,216,089
[45] Date of Patent: Jun. 1, 1993

[54] MODIFIED POLYPHENYLENE ETHER RESINS HAVING IMPROVED PROCESSABILITY AND OXIDATIVE STABILITY

[75] Inventors: Robert R. Gallucci; Ronald J. Wroczynski, both of Pittsfield, Mass.

[73] Assignee: General Electric Company, Pittsfield, Mass.

[21] Appl. No.: 236,041

[22] Filed: Aug. 24, 1988

Related U.S. Application Data

[63] Continuation of Ser. No. 901,434, Aug. 28, 1986, abandoned.

[51] Int. Cl.$^5$ .................. C08L 71/04; C08L 77/00
[52] U.S. Cl. ................................ 525/397; 525/905
[58] Field of Search .................... 525/397, 905

[56] References Cited

U.S. PATENT DOCUMENTS

| | | |
|---|---|---|
| 3,379,792 | 4/1968 | Finholt . |
| 3,383,435 | 5/1968 | Cizek . |
| 3,639,334 | 1/1972 | Holoch . |
| 3,660,531 | 5/1972 | Lauchlan et al. . |
| 4,456,736 | 6/1984 | Miyashita et al. ............ 525/397 |
| 4,530,952 | 7/1985 | Tayama et al. . |
| 4,563,500 | 1/1986 | Haaf et al. . |
| 4,654,405 | 3/1987 | Jalbert et al. ................ 525/397 |

FOREIGN PATENT DOCUMENTS 0107835  5/1984  European Pat. Off. .

*Primary Examiner*—Jacob Ziegler

[57] ABSTRACT

The processability and resistance to oxidative degradation of polyphenylene ether resins, alone, or in combination with a styrene resin, is improved by including a modifier comprising an alpha, beta-unsaturated carboxylic acid or derivative. In an embodiment, the formation of a composition comprising a poly(2,6-dimethyl-1,4-phenylene ether) and 2 parts per hundred of dibutyl maleate results in a 26 percent improvement in spiral flow, and a 30 percent reduction in oxygen uptake at 115° C. enhancing the utility of polyphenylene ether resins as extrusion and injection molding materials.

2 Claims, No Drawings

MODIFIED POLYPHENYLENE ETHER RESINS HAVING IMPROVED PROCESSABILITY AND OXIDATIVE STABILITY

This is a continuation of application Ser. No. 901,434 filed Aug. 28, 1986 now abandoned.

FIELD OF THE INVENTION

The present invention relates to modified polyphenylene ether resins having improved processability and resistance to oxidative degradation. Such improvements are brought about by incorporating into a polyphenylene ether resin an effective amount of a modifier comprising at least one alpha, beta-unsaturated carboxylic acid ester or a maleimide or derivative thereof. As a result of the present invention, polyphenylene ether resin compositions are provided with enhanced utility, e.g., as extrusion and injection molding materials.

BACKGROUND OF THE INVENTION

Polyphenylene ether resins are high performance engineering thermoplastics having relatively high melt viscosities and softening points (i.e., in excess of 200° C.). They are useful for many commercial applications requiring high temperature resistance and can be formed into films, fibers and molded articles. However, the art has recognized that polyphenylene ethers have major drawbacks, and these are unattractive flow properties and a tendency to degrade by taking up oxygen at elevated temperatures. There have, therefore, been attempts to improve the flow properties and the oxidation resistance of these resins. Finholt, U.S. Pat. No. 3,379,792, for example, discloses the addition of a polyamide to the polyphenylene ether. The polyamides are formed from the condensation of diamines and dibasic acids and the self-condensation of amino acids as well as polyamides formed by the polymerization of lactams Cizck, U.S. Pat. No. 3,383,435 discloses that improved processability of polyphenylene ether can be obtained by the addition of polystyrene and copolymers containing polystyrene including rubber modified high impact polystyrene. Butadiene containing additives are disclosed for the same purpose in Lauchlan, U.S. Pat. No. 3,660,531. More recently, Haaf et al., U.S. Pat. No. 4,563,500 disclosed adding a styrene resin and an impact modifying agent to polyphenylene ether to improve mold flow properties. The impact modifying agent comprises an elastomeric block copolymer of a vinyl aromatic compound and a conjugated diene and a hydrogenated derivative of the same. Holoch, U.S. Pat. No. 3,639,334, discloses that polyphenylene ether resins containing a small amount of a phosphite, a hydrazine or a mixture thereof show good resistance to embrittlement and discoloration at elevated temperatures in oxidizing atmospheres.

Despite these efforts, however, there is still an important need in the industry to improve the processability and the stability of polyphenylene ether resins.

It is therefore an object of the present invention to provide a polyphenylene ether resin composition with improved flow properties.

It is a further object of the invention to improve the oxidative stability of polyphenylene ether resins.

It is still another object to provide modified polyphenylene ether resin compositions with improved processability and thermal stability.

SUMMARY OF THE INVENTION

According to the present invention there is provided a composition containing a predominant amount of polyphenylene ether resin, alone, or in combination with a styrene resin, and an effective, flow-promoting and oxidative-stabilizing amount of a functionalizing modifier therefor comprising (i) a compound of the formula:

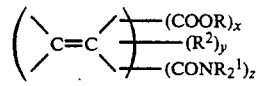

wherein R is selected from alkyl, aryl, alkaryl, haloalkyl, haloaryl or haloalkaryl; $R^1$ is selected independently from hydrogen, alkyl, aryl or alkaryl; $R^2$ is the same as defined for R and, in addition, hydrogen or halogen, preferably, chlorine or bromine, the total number of carbon atoms in R, $R^1$, $R^2$ being up to about 50; x, y and z each being zero or an integer selected from 1, 2, 3 or 4; $x+y+z$ being equal to 4 and $x+z$ being at least 2;

(ii) a compound of the formula:

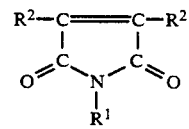

wherein $R^1$ and $R^2$ are as above defined; or (iii) a mixture of (i) and (ii).

The present invention also provides a method of improving the flow properties and oxidative stability of a polyphenylene ether resin, the method comprising adding an effective amount of a functionalizing modifier as defined above.

Also contemplated are articles molded from the polyphenylene ether resin and added modifier as defined above to improve processability and oxidative stability.

In preferred features, the polyphenylene ether resins will comprise poly(2,6-dimethyl-1,4-phenylene ether) and copolymers thereof, and the preferred modifiers will comprise dialkyl maleate or fumarate esters, as well as dialkylaryl maleate or fumarate esters. In other preferred embodiments, the polyphenylene ether resin will be used in combination with a styrene resin, preferably an unmodified polystyrene resin or a rubber modified high impact polystyrene resin. The modifier will preferably comprise from 0.1 to 20%, especially preferably from 0.5 to 5.0% by weight of the total composition.

DETAILED DESCRIPTION OF THE INVENTION

The polyphenylene ethers (also known as polyphenylene oxides) used as component (a) in the present invention are a well known class of polymers which have become very useful commercially as a result of the discovery by Hay of an efficient and economical method of production (see, for example, U.S. Pat. Nos. 3,306,874 and 3,306,875). Numerous modifications and variations have since been developed but, in general, they are characterized as a class by the presence of arylenoxy structural units. The present invention includes all such variations and modifications, including but not limited to those described hereinafter.

The polyphenylene ethers favored for use in the practice of this invention generally contain structural units of the following formula

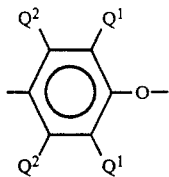

in which in each of these units independently each $Q^1$ is hydrogen, halogen, primary or secondary lower alkyl (i.e., alkyl containing up to 7 carbon atoms), phenyl, aminoalkyl or haloalkyl wherein at least two carbon atoms separate the halogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymers and copolymers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in the patent literature, including various Hay patents. Also contemplated are graft copolymers, including those prepared by grafting onto the polyphenylene ether chain such vinyl monomers as acrylonitrile and vinyl aromatic compounds (for example, styrene), and such polymers as polystyrenes and elastomers. Still other suitable polyphenylene ethers are the coupled polyphenylene ethers in which the coupling agent is reacted with the hydroxy groups of the two polyphenylene ether chains to increase the molecular weight of the polymer. Illustrative of the coupling agents are low molecular weight polycarbonates, quinones, heterocycles and formals.

The polyphenylene ether generally has a molecular weight (number average, as determined by gel permeation chromatography, whenever used herein) within the range of about 5,000 to 40,000. The intrinsic viscosity of the polymer is usually in the range of about 0.4 to 0.6 deciliters per gram (dl./g.), as measured in solution in chloroform at 25° C.

The polyphenylene ethers may be prepared by known methods, and typically by the oxidative coupling of at least one corresponding monohydroxyaromatic (e.g., phenolic) compound. A particularly useful and readily available monohydroxyaromatic compound is 2,6-xylenol (in which for the above formula each $Q^1$ is methyl and each $Q^2$ is hydrogen), the corresponding polymer of which may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound, such as a copper, manganese or cobalt compound, usually in combination with various other materials.

Among the preferred catalyst systems are those containing copper. Such catalysts are disclosed, for example, in the aforementioned U.S. Pat. Nos. 3,306,874 and 3,306,875, and elsewhere. They are usually combinations of cuprous or cupric ions, halide ions (i.e., chloride, bromide or iodide), and at least one amine.

Also preferred are catalyst systems containing manganese. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, alpha-hydroxyoximes (both monomeric and polymeric), o-hydroxyaryl oximes, and alpha-diketones. Also useful are cobalt-containing catalyst systems. Those skilled in the art will be familiar with patents disclosing manganese and cobalt-containing catalyst systems for polyphenylene ether preparation.

Especially useful polyphenylene ethers for the purposes of this invention are those which comprise molecules having at least one of the end groups of formulas II and III, below, in which $Q^1$ and $Q^2$ are as previously defined, each $R^3$ is independently hydrogen or alkykl, providing that the total number of carbon atoms in both $R^3$ radicals is 6 or less, and each $R^4$ is independently hydrogen or a $C_{1-6}$ primary alkyl radical. Preferably, each $R^3$ is hydrogen and each $R^4$ is alkyl, especially methyl or n-butyl.

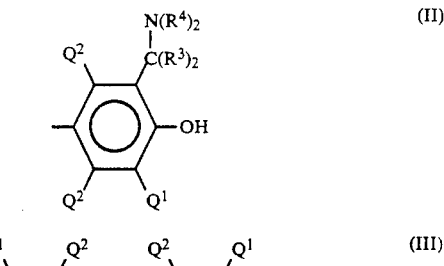

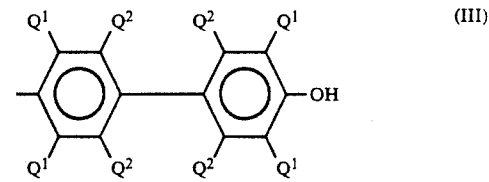

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the alpha-hydrogen atoms on one or more $Q^1$ radicals adjacent to the hydroxy group on the terminal unit of the polymer chain. During further processing and/or blending, the aminoalkyl-substituted end groups may undergo various reactions, possibly involving a quinone methide-type intermediate of formula IV, below (R³ is defined as above), with beneficial effects often including an increase in impact strength and compatibilization with other blend components.

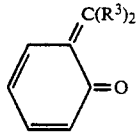  (IV)

Polymers with biphenol end groups of formula III are typically obtained from reaction mixtures in which a by-product diphenoquinone of formula V, below, is present, especially in a copper-halide-secondary or tertiary amine system. In this regard, the disclosures of the U.S. Pat. Nos. 4,234,706, 4,477,649 and 4,482,697 are particularly pertinent, and are incorporated herein by reference. In mixtures of this type, the diphenoquinone is ultimately incorporated into the polymer in substantial amounts, chiefly as an end group.

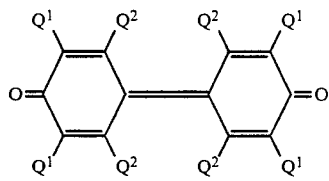  (V)

In many polyphenylene ethers obtained under the conditions described above, a substantial proportion of the polymer molecules, usually as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will thus be apparent to those skilled in the art that a wide range or polymeric materials encompassing the full recognized class of polyphenylene ether resins are contemplated as suitable for use in the practice of the present invention.

In the embodiments disclosed herein, the compositions comprising polyphenylene ethers in combination with styrene resins can be made following the teachings in Cizek, U.S. Pat. No. 3,383,435. Although the blends can vary from 1:99 to 99:1, particularly preferred compositions comprise from 25 to 75 parts by weight of a polyphenylene ether in combination with 75 to 25 parts by weight of a styrene resin.

The styrene resin is one having at least 25 percent by weight, polymer units derived from the compound having the formula:

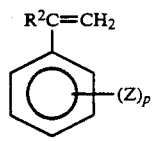

where $R^2$ is hydrogen, (lower)alkyl or halogen; Z is a member selected from the class consisting of vinyl, hydrogen, chlorine and (lower)alkyl; and p is a whole number equal to from 0 to 5. The term "styrene resin" as used throughout this disclosure and in the claims, and defined by the above formula includes by way of example, unmodified homopolymers such as polystyrene, the modified polystyrenes such as rubber modified polystyrenes, and the styrene containing copolymers such as the styrene-acrylonitrile copolymers (SAN), styrene-butadiene copolymers, styrene-acrylonitrile-alpha-alkyl styrene copolymers, styrene-acrylonitrile-butadiene copolymers (ABS), poly-alpha-methylstyrene, copolymers of ethylvinylbenzene and divinylbenzene, and the like. The preferred styrene resins are the high impact polystyrenes, the ABS copolymers and the SAN copolymers.

The flow and oxidative stability-promoting compounds used as component (b) in the present invention are represented by the general formula:

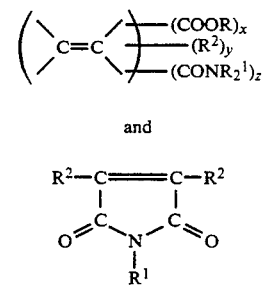

and wherein R, $R^1$, $R^2$, x, y and z are as above defined. These can be made in ways known to those skilled in this art, and many of them are commercially available. One convenient procedure to make the fumarate esters is to react the corresponding acid chloride with the corresponding alcohol, preferably in the presence of an acid acceptor. Maleates can be made from maleic anhydride and the corresponding alcohol. A convenient procedure to make the maleimides is to react maleic anhydride or a substituted derivative thereof with the corresponding primary amine, or to react maleimide with the corresponding alkyl or aryl halide, preferably under acid binding conditions.

The preferred flow promoting compounds of the present invention are alpha, beta-dicarboxylic acids, dialkyl maleates and fumarates, and N-alkyl and N-aryl maleimides, and mixtures thereof especially dimethyl maleate, dibutyl maleate, diethylhexyl maleate, ditridecyl maleate, dicyclohexyl maleate, dibutyl fumarate, diethylhexyl fumarate, ditridecyl fumarate, dibenzyl fumarate, mixtures of dialkyl fumarates, N-phenyl maleimide or mixtures of any of the foregoing.

The flow promoting compounds employed in the present invention are added to polyphenylene ethers and optional styrene resins in amounts which can vary broadly. Preferably, however, the amount will be of from 0.1 to 20% by weight, and especially preferably 0.5 to 5.0% percent by weight based on the overall weight of the resinous components in the composition.

The present kinds of compositions can also be formulated to include other ingredients in addition to those just described. These may be selected from among conventional materials commonly employed in polyphenylene ether resin blends, some of which are non-polymeric, others of which can be polymeric. Examples are plasticizers, mold release agents, colorants, mineral fillers (for example, clay), glass reinforcements, titanium oxides, lubricants, and so forth. Conventional amounts of these varying, for example, from less than 1 to greater than 50 percent by weight, per 100 percent by weight of the total composition, may be utilized. In general, melt viscosity improvers, stabilizers, and antioxidants can either be eliminated entirely or the amounts conventionally employed can be drastically reduced.

The compositions can be prepared by any convenient method and, preferably, by forming a preblend of the ingredients, compounding the preblend by passing through an extruder, and cooling the extrudate and cutting it into pellets or tablets. A convenient extrusion temperature is 300° C. The tabletted compositions can later be formed into the desired article, as by molding at elevated temperatures. A convenient molding temperature is 300° C., but lower if a styrene resin is present.

Because of their thermoplastic nature, the present compositions are particularly suitable for injection molding processes. Using standard procedures and conditions, these blends can be molded to various shapes and sizes, and the resulting products, besides having good processability, are characterized by excellent resistance to degradation by oxygen.

The present polyphenylene ether resin compositions exhibit improved flow characteristics as compared with untreated polyphenylene ether resins by as much as 50 percent or more, typically above 20 percent. If styrene resins are present flow is improved, but not so dramatically, because styrene resins themselves have excellent flow. A further unexpected advantage of employing the flow promoting additives described herein is that the oxygen uptake of the composition during processing is reduced, usually by 25–30% in comparison with controls. Accordingly, the compositions of the present invention demonstrate improved oxidative stability over unmodified polyphenylene ether resin.

While the reason for the beneficial effects are not clearly understood at this time, it is believed that the modifiers chemically react with the polyphenylene ether resin to reduce the molecular weight increase which usually accompanies the melting of polyphenylene ether resins, and that they also act as processing aids.

DESCRIPTION OF THE PREFERRED EMBODIMENTS

The following examples are set forth for illustrative purposes only and are not intended to limit the invention as set forth in the claims of the application.

EXAMPLE 1

Poly(2,6-dimethyl-1,4-phenylene Ether) with 2 percent by weight of Dibutyl Maleate A blend of the ingredients was prepared, compounding the blend by passage through a extruder at about 300° C. melt temperature, and cooling and chopping the extrudate into pellets. The pellets were molded into ⅛ inch-thick test pieces, using a 3-ounce Newbury injection molding machine, a 315° melt temperature, and a 90° mold temperature. In addition, pelletized samples were used for the oxygen uptake test, at 115° C.

EXAMPLE 2

Poly(2,6-dimethyl-1,4-phenylene Ether) modified with 1 percent by weight of N-phenyl Maleimide The procedure of Example 1 was repeated, substituting N-phenyl maleimide for dibutyl maleate. The compositions produced in Examples 1 and 2, respectively, were tested for the various properties shown in Table 1 according to procedures known to those skilled in the art. For the spiral flow test, samples were injection molded into a spiral channel under identical conditions. The distance traveled by the materials before they stopped flowing is stated to be the spiral flow, in inches. Each value is the average of more than ten tests. The higher the number, the greater the flow. The flow channel was ⅛"×5/16", the maximum length was 40 inches. The mold temperature was 90° C. and the extruder temperature was 315° C. Primary injection pressure was 1500 psi., secondary injection pressure 500 psi and total injection time was 10 seconds. A third sample containing no additive and being composed solely of poly(2,6-dimethyl-1,4-phenylene) ether resin was tested in a like manner.

TABLE 1

| Property | Control Unmodified Polyphenylene Ether Resin (PPO) | Example 1 PPO + 2% dibutyl maleate | Example 2 PPO + 1% N-phenyl maleimide |
|---|---|---|---|
| (a) HDT °F. 264 psi | 361 | 347 | N.D. |
| (b) Tensile Str. Kpsi (yield) | 11.7 | 12.2 | N.D. |
| (c) % Elong. | 12 | 10 | N.D. |
| (c) Flex Mod. Kpsi | 376 | 340 | N.D. |
| (d) Flex Str. Kpsi | 15.7 | 14.8 | N.D. |
| (e) Notched Izod ft-lbs/in. | 1.0 | 1.0 | N.D. |
| (f) Spiral Flow ⅛" 600° F., in. | 15.4 | 19.4 | 18.8 |

(a) Heat Distortion Temperature, ASTM D-648.
(b) Tensile strength and elongation at break, D-638.
(c) Flexural Modulus, ASTM D-790.
(d) Flexural Strength, ASTM D-790.
(e) Izod-Impact Strength, ASTM D-256.
(f) Spiral Flow Test, as described above.
N.D. Not Determined As shown in Table 1, Examples 1 and 2 exhibited a 26% and 22%, respectively, greater spiral flow than the control sample, strong evidence of an improvement in processability.

EXAMPLES 3–9

The procedure of Example 1 was repeated, substituting different amounts and types of modifiers. The compositions and the properties are summarized in Table 2.

TABLE 2

| EXAMPLE NO. | COMPOSITION | SPIRAL FLOW (in.) ⅛ in. 600° F. | Glass transition Temperature Tg °C. | Intrinsic Viscosity dl./g. (CHCl₃) |
|---|---|---|---|---|
| Control | UNMODIFIED Polyphenylene Ether Resin | 15.4 — | 210 | 0.57 |
| 3 | Dibutyl Maleate, 0.5% | 16.8 (9%)* | 207 | 0.60 |

TABLE 2-continued

| EXAMPLE NO. | COMPOSITION | SPIRAL FLOW (in.) ⅛ in. 600° F. | Glass transition Temperature Tg °C. | Intrinsic Viscosity dl./g. (CHCl₃) |
|---|---|---|---|---|
| 4 | Dibutyl Maleate, 1.0% | 18.0 (17%) | 204 | 0.51 |
| 5 | Dibutyl Maleate, 2.0% | 20.1 (31%) | 199 | 0.46 |
| 6 | Dibutyl Maleate, 4.0% | 26.6 (73%) | 185 | 0.46 |
| 7 | Diethylhexyl Maleate, 1.49% | 18.8 (22%) | 201 | 0.53 |
| 8 | Diethylhexyl Maleate, 2.0% | 21.0 (36%) | 196 | 0.51 |
| 9 | Ditridecyl Maleate, 2.11% | 19.2 (25%) | 198 | 0.51 |

*percentage increase in spiral flow over the control sample.

As evident from the results in Table 2, the incorporation of the additives encompassed by the present invention and incorporated into a polyphenylene ether resin composition resulted in a significant improvement (9-73%) of the flow characteristics.

EXAMPLES 10-14

Examples 10-14 were prepared in the same manner as Example 1. The compositions used and the results obtained are shown in Table 3:

TABLE 3

| EXAMPLE NO. | COMPOSITION | SPIRAL FLOW (in.) ⅛ in. 600° F. | Glass Transition Temperature Tg °C. | Intrinsic Viscosity dl/g. CHCl₃ |
|---|---|---|---|---|
| Control | UNMODIFIED Polyphenylene Ether Resin | 15.4 — | 210 | 0.57 |
| 10 | Dimethyl Maleate, 0.85% | 18.0 (17%)* | 208 | 0.51 |
| 11 | Dimethyl Maleate, 2.0% | 20.7 (34%) | 204 | 0.50 |
| 12 | Dibutyl Maleate, 2.0% | 19.4 (26%) | 199 | 0.51 |
| 13 | Dicyclohexyl Maleate, 2.0% | 22.0 (43%) | 201 | 0.51 |
| 14 | N-Phenyl Maleimide, 1.0% | 18.8 (22%) | 206 | 0.53 |

*percentage increase in spiral flow over the control sample.

The results shown in Table 3 indicate that the spiral flow of the compositions of the present invention was 17-43% greater than the unmodified polyphenylene ether resin control sample.

EXAMPLES 15-20

Examples 15-20 were prepared in the same manner as Example 1. The compositions used and the results obtained are shown in Table 4:

TABLE 4

| EXAMPLE NO. | COMPOSITION | SPIRAL FLOW (in.) ⅛ in. 600° F. | Glass Transition Temperature Tg, °C. | Intrinsic Viscosity dl./g. (CHCl₃) |
|---|---|---|---|---|
| Control | UNMODIFIED Polyphenylene Ether Resin | 15.4 | 210 | 0.57 |
| 15 | Dibutyl Fumarate, 1.0% | 17.9 (16%)* | 204 | 0.53 |
| 16 | Dibutyl Fumarate, 2.0% | 21.9 (42%) | — | 0.49 |
| 17 | Diethylhexyl Fumarate, 1.49% | 19.0 (23%) | 201 | 0.51 |
| 18 | Ditridecyl Fumarate, 2.11% | 19.4 (26%) | 201 | 0.51 |
| 19 | ~nC₅₀ Dialkyl Fumarate**, 6.6% | 23.6 (53%) | 186 | 0.54 |
| 20 | Dibenzyl Fumarate, 2.0% | 23.0 (49%) | 199 | 0.47 |

*percentage increase in spiral flow over the control sample.
**nC₅₀ dialkyl fumarate is a mixture of dialkyl fumarate esters which is the reaction product of C₅₀ linear alcohols and fumaryl chloride. Dibenzyl fumarate was made by reacting benzyl alcohol and fumaryl chloride. All of the maleates, and other fumarates were obtained from Reichold Chemicals, Inc., New York, U.S.A. N-phenyl maleimide was obtained from Aldrich Chemical Co.

EXAMPLES 21-22

The procedure of Example 1 was repeated, substituting dioctyl maleate (DOM) for the dibutyl maleate and using an unmodified polystyrene resin from Monsanto Co. in combination with the polyphenylene ether resin. The compositions and properties are summarized in Table 5:

TABLE 5

| EXAMPLE NO. | COMPOSITION[c] | SPIRAL FLOW (in.) ⅛ in., 600° F. | Intrinsic Viscosity dl./g. (CHCl₃) |
|---|---|---|---|
| 21A Control | 50 PPO/50 PS | 17.3 | 0.63 |
| 21 | 50 PPO/50 PS/ 2.0 DOM[a] | 19.5 (13%)[b] | 0.62 |
| 22A Control | 75 PPO/25PS | 11.7 — | 0.70 |
| 22 | 75 PPO/25 PS/ 2.0 DOM | 13.0 (11%) | 0.69 |

[a] DOM - Di(2-ethylhexyl)maleate
[b] (—%) percent improvement over the control
[c] 50/50 blend molded at 475° F.; 75/25 blend molded at 500° F.

The results shown in Tables 4 and 5 provide further evidence of improved flow properties for the modified polyphenylene ether resin compositions of the present invention.

EXAMPLES 23-25

To demonstrate the improvements in oxidative stability of the compositions of the present invention, blends were prepared according to Example 1, and various maleates were substituted for dibutyl maleate, and the relative oxygen uptakes were determined by measuring at 115° C. on samples of pellets by monitoring the pressure of oxygen gas sealed in a test chamber with the pellets. The reduction in oxygen pressure is measured versus time. The tests were carried out over 21 days. An unmodified poly(2,6-dimethyl-1,4-phenylene) ether was used as a control. The compositions used, and the results obtained are set forth in Table 6:

TABLE 6

OXYGEN UPTAKE IN COMPOSITIONS COMPRISING POLYPHENYLENE ETHER RESINS

| Example | 23A* | 23 | 24 | 25 |
|---|---|---|---|---|
| Compositions (parts by weight) | | | | |
| Poly(2,6-dimethyl-1,4-phenylene ether) | 100 | 98 | 98 | 98 |
| Dibutyl Maleate | — | 2 | — | — |
| Dimethyl Maleate | — | — | 2 | — |
| Diethylhexyl Maleate | — | — | — | 2 |
| Properties | | | | |
| Relative Oxygen Uptake, 115° C. | 1.0 | 0.70 | 0.75 | 0.75 |

*Control

The modified polyphenylene ether resins according to this invention show a reduction of 25 and 30% in the oxidation rate, as compared to the control, indicative of the resistance to long term embrittlement and color development achieved by the present composition.

The above-mentioned patents and publications are incorporated herein by reference.

Many variations of the present invention will be obvious to those skilled in this art in light of the above, detailed description. For example, instead of poly(2,6-dimethyl-1,4-phenylene ether) other resins can be used, such as poly(2,6-dimethyl-co-2,3,6-trimethyl-1,4-phenylene ether). Instead of unmodified polystyrene, there can be substituted a high impact rubber modified polystyrene comprising an interpolymer of polystyrene and 9 weight % of polybutadiene rubber. All such obvious variations are within the full intended scope of the appended claims.

We claim:

1. A composition comprising the reaction product of:
   (a) resin composition consisting essentially of a polyphenylene ether resin; and
   (b) an effective, flow-promoting or oxidative stability-improving amount of a functionalizing modifier for (a) selected from the group consisting of a dialkyl maleate, a diaryl maleate, a dialkyl fumarate, a diaryl fumarate, and a mixture of any of the foregoing.

2. The composition of claim 1, wherein component (b) is selected from the group consisting of dibutyl maleate, dimethyl maleate, diethylhexyl maleate, ditridecyl maleate, dicyclohexyl maleate, dibutyl fumarate, ditridecyl fumarate, dibenzyl fumarate, mixtures of dialkyl fumarates, and mixtures of any of the foregoing.

* * * * *